(No Model.) 5 Sheets—Sheet 2.
S. VANSTONE.
MACHINE FOR MAKING PIPE CLIPS.
No. 494,536. Patented Mar. 28, 1893.
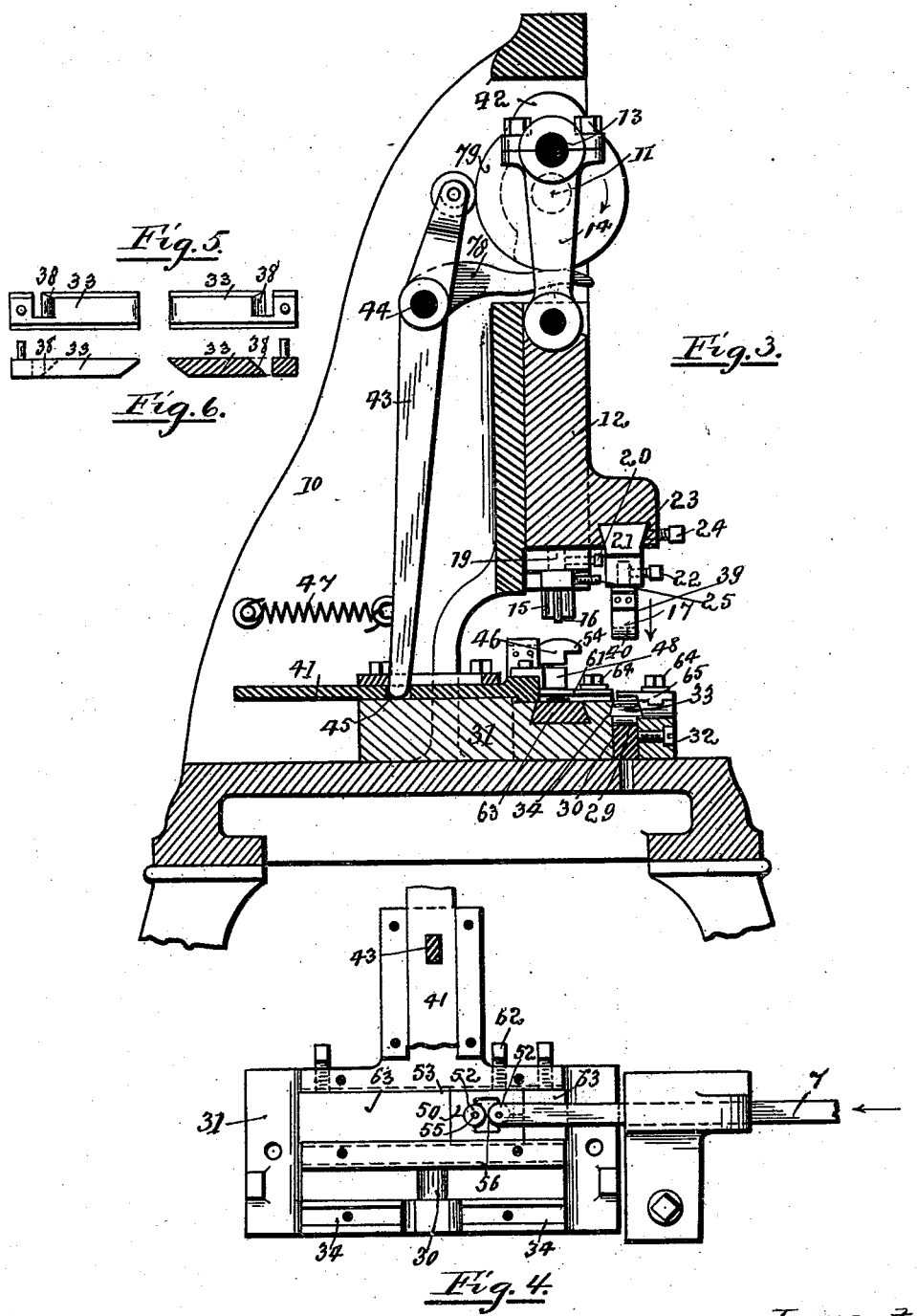

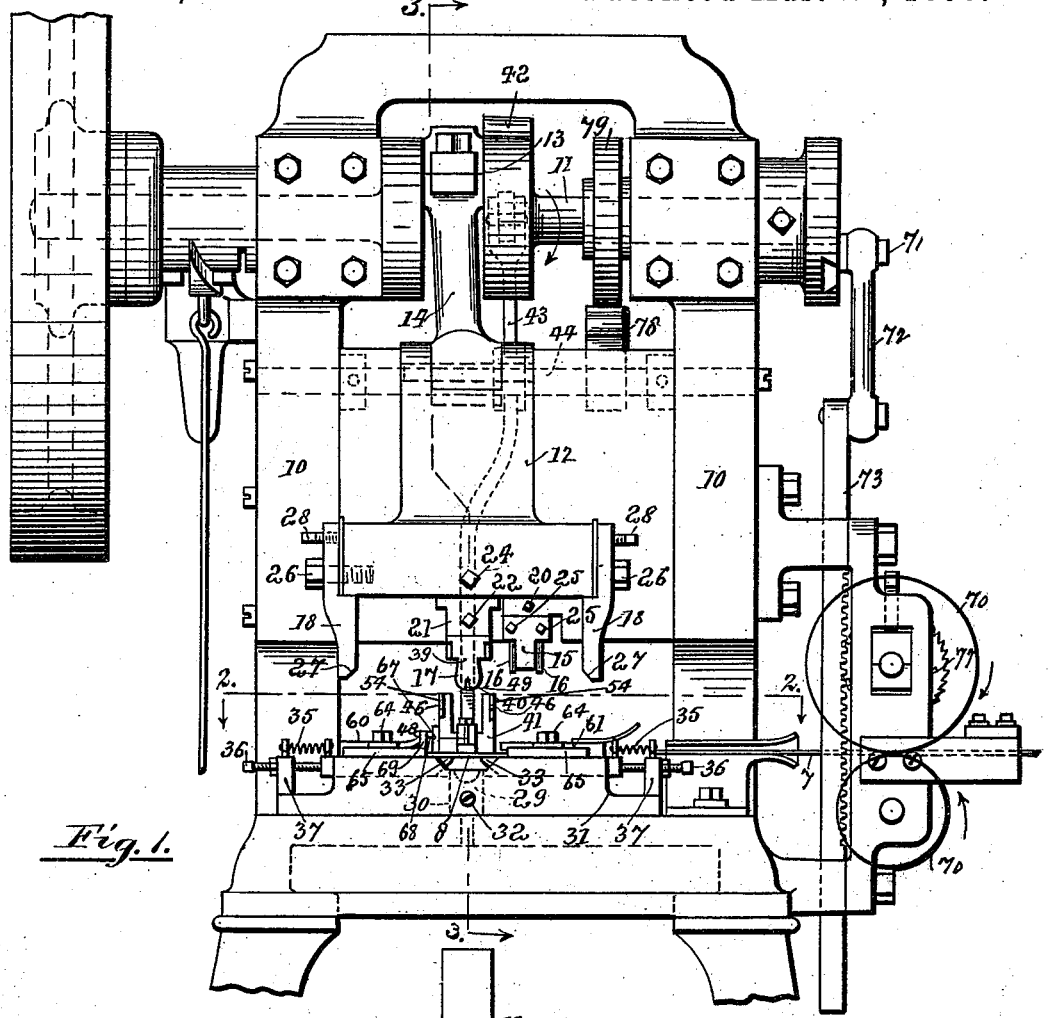

(No Model.) 5 Sheets—Sheet 3.
S. VANSTONE.
MACHINE FOR MAKING PIPE CLIPS.
No. 494,536. Patented Mar. 28, 1893.
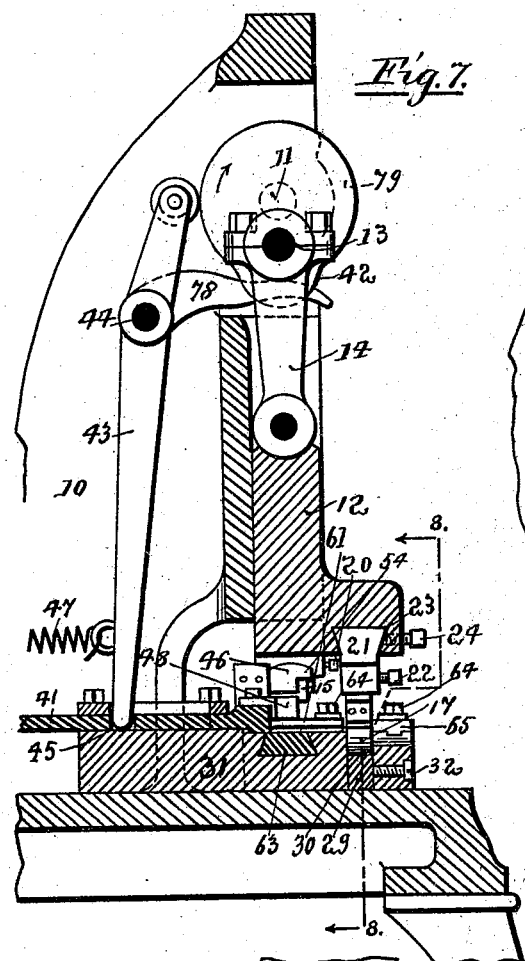
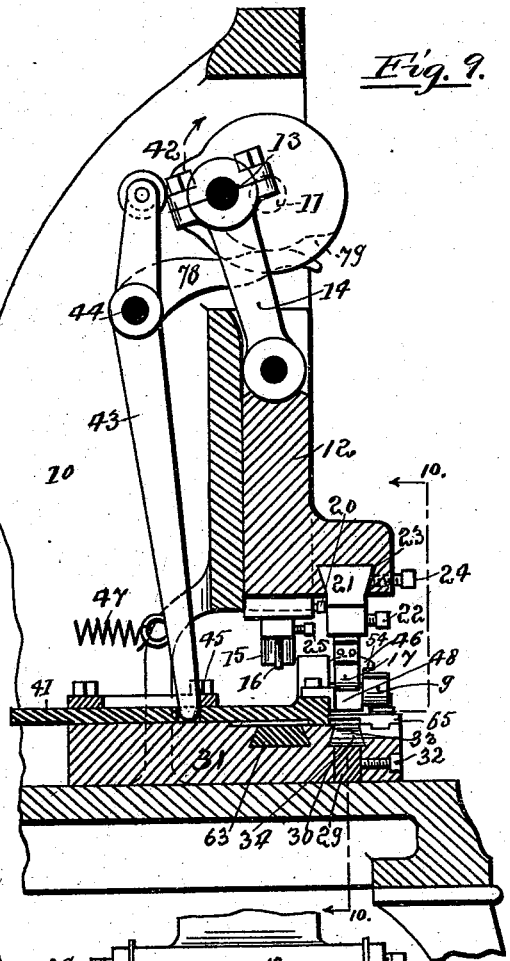
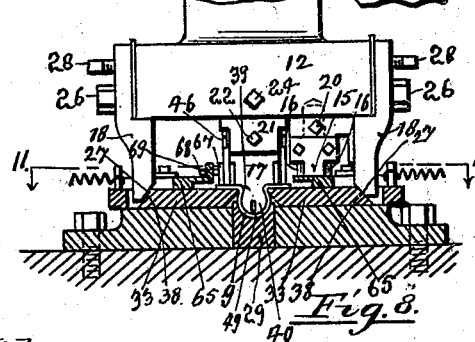
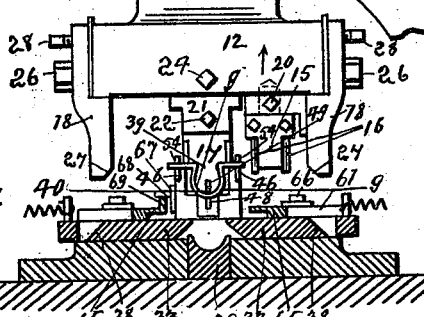
Witnesses.
Inventor.
Samuel Vanstone
by S. Schofield
Atty.

(No Model.) 5 Sheets—Sheet 4.
S. VANSTONE.
MACHINE FOR MAKING PIPE CLIPS.
No. 494,536. Patented Mar. 28, 1893.
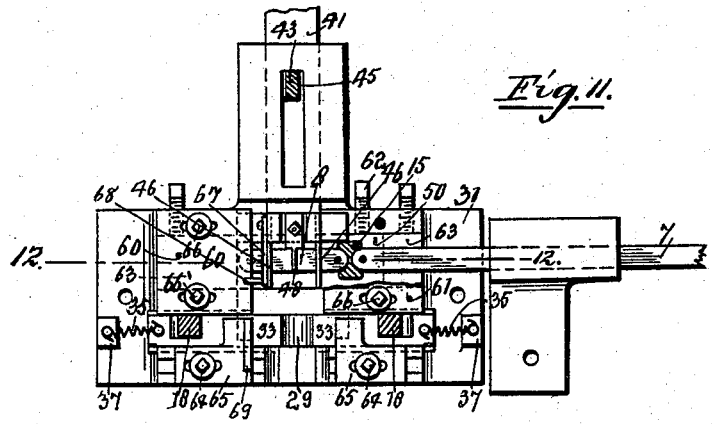
Fig. 11.
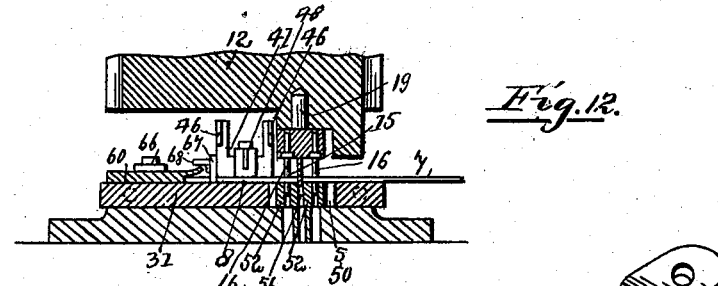
Fig. 12.
Fig. 15.
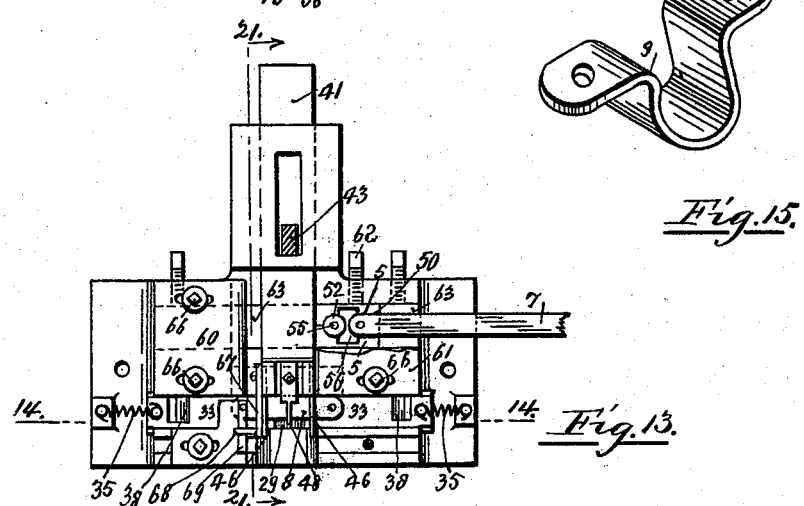
Fig. 13.
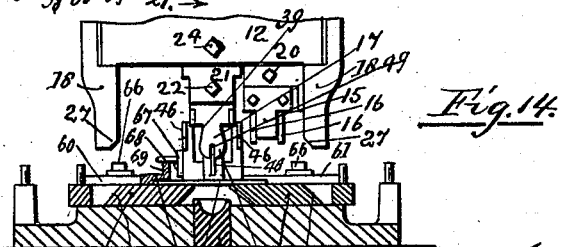
Fig. 14.
Witnesses.
Charles Hannigan.
James W. Bowman.
Inventor.
Samuel Vanstone
by S. Schofield
ATTY.
THE NORRIS PETERS CO., PHOTO-LITHO., WASHINGTON, D. C.

(No Model.) 5 Sheets—Sheet 5.

S. VANSTONE.
MACHINE FOR MAKING PIPE CLIPS.

No. 494,536. Patented Mar. 28, 1893.

Witnesses.
Charles Hannigan
James W Brumm

Inventor.
Samuel Vanstone
by S. Schofield
Atty.

UNITED STATES PATENT OFFICE.

SAMUEL VANSTONE, OF PROVIDENCE, RHODE ISLAND, ASSIGNOR OF THREE-FOURTHS TO WILLIAM K. ATWOOD AND JOSEPH NICHOLS, OF SAME PLACE.

MACHINE FOR MAKING PIPE-CLIPS.

SPECIFICATION forming part of Letters Patent No. 494,536, dated March 28, 1893.

Application filed July 29, 1892. Serial No. 441,609. (No model.)

*To all whom it may concern:*

Be it known that I, SAMUEL VANSTONE, a citizen of the United States, residing at Providence, in the State of Rhode Island, have invented a new and useful Improvement in Machines for Making Pipe-Clips, of which the following is a specification.

My invention consists in the improved construction and arrangement of the several parts of the machine, and in the improved construction and operation of the dies, as hereinafter fully set forth.

Figure 19:
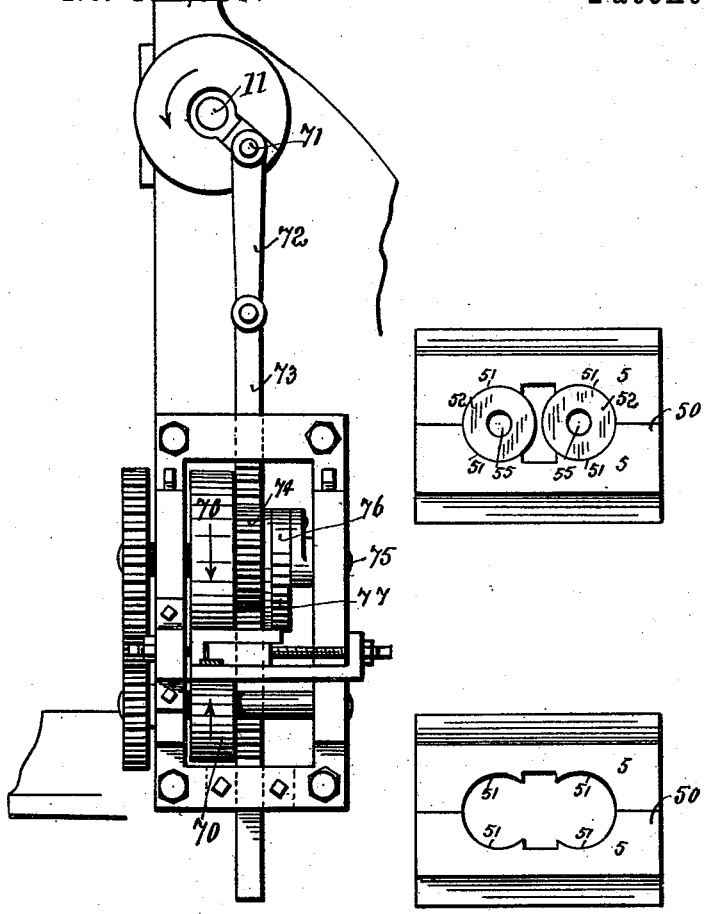
Figure 16:
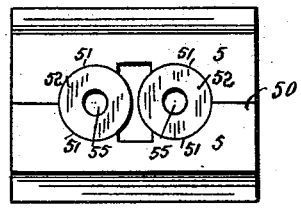
Figure 17:
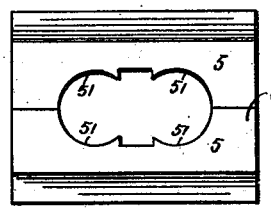
Figure 21:
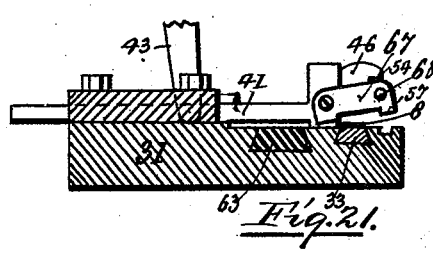
Figure 18:
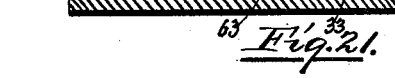
Figure 20:
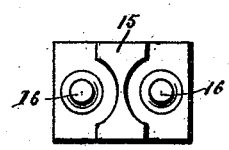
Figure 22:
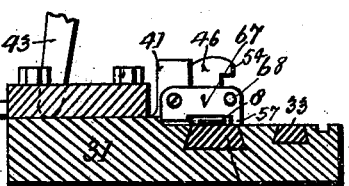

Figure 1, represents a front elevation of the machine. Fig. 2, represents a top view of the die-bed of the machine as taken from the line 2, 2, of Fig. 1. Fig. 3, represents a vertical section taken in the line 3, 3, of Fig. 1, with the plungers in their extreme upward position. Fig. 4, represents a top view of the die-bed of the machine, the covering parts being removed. Fig. 5, represents a top view of the opposite bending dies. Fig. 6, represents an edge view and a vertical section of the same. Fig. 7, represents a vertical section taken in the line 3, 3, of Fig. 1, with the plunger in its extreme lower position. Fig. 8, represents a vertical section taken in the line 8, 8, of Fig. 7. Fig. 9, represents a vertical section taken in the line 3, 3, of Fig. 1, with the plunger in its intermediate position. Fig. 10, represents a vertical section taken in the line 10, 10, of Fig. 9. Fig. 11 represents a top view of the die-bed with the carrier in its rearward position. Fig. 12, represents a vertical section taken in the line 12, 12, of Fig. 11. Fig. 13, represents a top view of the die-bed, showing the carrier in its forward position. Fig. 14, represents a vertical section, taken in the line 14, 14, of Fig. 13. Fig. 15, represents the spring clip to be formed in the machine. Fig. 16, represents an enlarged plan view of the cutting and punching dies, in the die holder. Fig. 17, represents the die holder without the dies. Fig. 18, is a perspective view of one of the dies removed from the holder. Fig. 19, represents a detail side view showing the feeding mechanism. Fig. 20 represents an under view of the cutting off plunger. Fig. 21, represents a vertical section taken in the line 21, 21, of Fig. 13, with the carrier in its forward position. Fig. 22, represents the same with the carrier in its backward position.

In the accompanying drawings, 10— represents the frame of the machine, 11 the driving shaft, and 12 the plunger head, which is connected with a crank 13 of the shaft 11, by means of the connecting rod 14. The plunger head 12 is provided with the cutting off plunger 15, the circular punches 16, the forming plunger 17, and the cam pieces 18.

The cutting off plunger 15, is formed of a piece of steel made in the proper concave form at its sides to round the ends of the cut off blank, and retained in its holding socket 19, by means of the set screw 20.

The forming plunger 17, is held in the adjustable holder 21, by means of the set-screw 22, and the said adjustable holder 21, is held in the dove-tailed groove 23, of the plunger head, by means of the set screw 24; and the punches 16, are held in their holding sockets, by means of the set screws 25. The opposite cam pieces 18, are secured to the plunger head 12, by means of the screw bolt 26, and are made capable of inward adjustment at the lower or engaging end 27, by means of the adjusting screw 28.

The concave die 29, for bending the clip, is held in its socket 30 in the die holding bed 31, by means of the set screw 32, and above the die 29, and at either side of the same, are placed the sliding plungers 33, which serve, first in conjunction with the forming plunger 17, to bend the arms of the clip 9, and then, by an inward movement, to bend the sides of the clip inwardly, so that when applied to a pipe, the clip will retain its position upon the same until properly secured by the attaching screws. The sliding plungers 33, are held in the dove-tailed grooves 34, of the die holding bed, and the backward movement of the said plungers, is effected, by means of the spiral springs 35; and the extent of such movement, is controlled, by means of the adjusting screws 36, which are held in the screw threaded standards 37. The plungers 33, are each provided with the inclined surface 38, which by engaging with the inclined surfaces 27, of the cam pieces 18, will serve to force the plungers 33, toward each other against the side of the forming plunger 17, as shown in Fig. 8, to force the arms of the clip 9 inwardly so that they will grip the pipe, the forming plunger 17, being recessed or made narrower at its neck 39, than at its rounded end 40. The sliding carrier 41, is operated from the cam 42, on the driving shaft, by means of the lever 43, which is attached to the pivot rod 44, and held against the cam by means of the spiral spring 47. The lower end of the lever 43 is held in the slot 45, in the carrier 41; the said carrier being also provided with the clearers 46, which are provided with the horns 54 adapted to engage with the attaching ears of the clip 9, as shown in Figs. 9 and 10, while the clearer 48, which is also attached to the carrier 41 enters the central slot 49 of the forming plunger 17, and acts against the curved portion of the clip, to cause its removal from the forming plunger.

The cutting off and punching dies are preferably made as shown enlarged in Figs. 16, 17 and 18, the die holder 50 being made in two parts 5, 5, each provided with the curved recesses 51, which are adapted to receive and hold the dies 52, the said dies being provided with the central perforation 55, which receives the end of the punch 16, for making the perforation in the ends of the clip. The cutting off plunger 15 is made to fit the space 56, between the peripheries of the dies 52, and when the said dies get dull at one side, their sides may be reversed, thus providing a fresh cutting edge, and when both corners of the die are dull, the dies can be taken from the die holder, and ground on an emery wheel to a proper cutting edge.

The die-holder 50 is held in the die holding groove 53, by means of the set screw 62, the remaining portions of the groove 53 being filled with the supporting blocks 63, 63. The cut off blank 8, rests under the parallel adjustable guide plates 60 and 61, which are held upon the die holding bed 31 by means of the screws 66, and the adjustable stop plates 65, are arranged to hold the blank in its proper position over the forming die, the said plates being held upon the bed 31 by means of the set screws 64.

At the side of the carrier 41, is pivoted the latch 67, provided with the projecting pin 68, which upon the forward movement of the carrier, will pass onto the upright flange 69, on the stop plate 65, and will serve to raise the forward end of the latch from the bed, on which it rests.

The metal strip 7, of which the clip is formed, is fed to the cutting off die by means of the geared feed rolls 70, 70, which are operated from the shaft 11, by means of the adjustable crank 71, connecting rod 72, and the reciprocating rod 73; the said rack being made to engage with the gear 74, which is loose on the shaft 75 of the upper feed roll 70: and to the side of the said gear, is attached the dog 76, which engages with the teeth of the ratchet wheel 77, secured to the shaft 75, thus causing the forward movement of the strip 7, at each revolution, of the shaft 11. When the strip 7 is fed forward by the action of the rolls 70, 70, the end of the said strip will pass inside of the hook 57 of the gravitating or spring actuated latch 67, as shown in Fig. 22, which will operate to prevent the turning of the forward end of the blank by reason of the imperfect action of the punches and the cutting off plunger which may result in the production of an engaging fin, which will cause the adhesion of the rearward end of the blank to the die, and when the blank has been properly started from the die, the pin 68 will, by engaging with the flange 69, of the stop plate 65, raise the hook 57, as shown in Fig. 21, so that the blank 8 will be left in its proper position, over the forming die, upon the backward movement of the carrier.

The operation of the machine will be as follows: The strip of hoop iron 7 to form the clips is fed forward to the cutting off and punching die 52 by means of the feeding rolls 70, 70, upon the upward movement of the plunger head 12, the end of the strip 7 being carried forward so as to rest under the projecting lip 59 of the adjustable guide plate 60, and inside of the hook 57 of the latch 67. Upon the downward movement of the cutting off plunger 15 and the punches 16, the blank 8 will be cut off from the strip 7, and punched. Then upon the succeeding upward movement of the plunger head, the carrier 41 will be brought forward, carrying the cut off blank under the guide plates 60 and 61, to a position over the concave die 29, so that, upon the succeeding downward movement of the forming plunger 17, the blank will be bent to form the spring clip as shown in Fig. 3, and then, upon the upward movement of the plunger head 12, the carrier 41 will be again brought forward with another blank, and the clearers 46 and 48, attached to the said carrier will engage with the finished clip, and cause the forcible removal of the same, from the forming plunger 17.

By the attachment of the arm 78 to the pivot rod 44, for engagement with the cam 79, on the shaft 11, the carrier 41 will be operated back and forth in a positive manner, and without entire dependence upon the action of the spring 47.

I claim as my invention—

1. The combination with the die holder made in two parts, and the perforated dies held therein, of the opposite punches, and the intervening cutting off plunger, substantially as described.

2. The combination with the reciprocating plunger head, provided with the cutting off and punching plungers, and the forming plunger, of the cutting off and punching dies, the concave forming die, and the reciprocating carrier for transferring the blank laterally from the cutting off and punching dies, to the forming die, substantially as described.

3. The combination with the reciprocating plunger-head, provided with the cutting-off and punching plungers, and the contracted or recessed forming plunger, of the cutting off and punching dies, the concave forming die, and the reciprocating carrier for transferring the blank laterally from the cutting off and punching dies to the forming die, the plungers for forcing the bent clip into the recess or contraction at the sides of the forming plunger, and the clearers adapted to force the clip laterally from the forming plunger, substantially as described.

4. The combination with the forming plunger, provided with a slot at its end, and contracted or recessed at its base, and the concave forming die, of the plungers for forcing the sides of the bent clip into the recess of the forming plunger, and the clearer adapted to enter the slot in the forming plunger, to force the finished clip from the same, substantially as described.

5. The combination with the reciprocating plunger head, provided with the forming plunger, contracted or recessed at its base, and the opposite inclined cam pieces, of the concave forming die, and the spring actuated plungers provided with an incline, adapted for the engagement of the cam pieces to cause the forward movement of the said plungers, to force the bent clip into the recess or contraction at the sides of the forming die, substantially as described.

6. The combination with the cutting off and punching dies, and the concave forming die, of the adjustable guide plates, the adjustable stops for holding the blank over the forming die, and the reciprocating carrier for transporting the blank laterally from the cutting off and punching dies to its position over the forming die, substantially as described.

7. The combination with the cutting off and punching dies, and the forming die, of the reciprocating carrier for transporting the blank laterally from the cutting off and punching dies, to its position over the forming dies, and means for preventing the turning of the blank, upon the initial forward movement of the carrier, substantially as described.

SAMUEL VANSTONE.

Witnesses:
SOCRATES SCHOLFIELD,
JOSEPH J. SCHOLFIELD.